2 Sheets–Sheet II.

WILLIAM H. H. PEAIRS.

Improvement in Baling Presses.

No. 121,408. Patented Nov. 28, 1871.

Witnesses:
Edwin James
K. G. Gorgon

Inventor:
William H. H. Peairs
per J. S. J. Holsted
Attorney

UNITED STATES PATENT OFFICE.

WILLIAM H. H. PEAIRS, OF OLATHE, KANSAS.

IMPROVEMENT IN BALING-PRESSES.

Specification forming part of Letters Patent No. 121,408, dated November 28, 1871.

*To all whom it may concern:*

Be it known that I, WILLIAM H. H. PEAIRS, of Olathe, in the county of Johnson and State of Kansas, have invented certain new and useful Improvements in Baling-Presses, of which the following is a full, clear, and exact description, reference being had to the accompanying drawing and the letters of reference marked thereon making part of this specification, in which—

Figure 1:
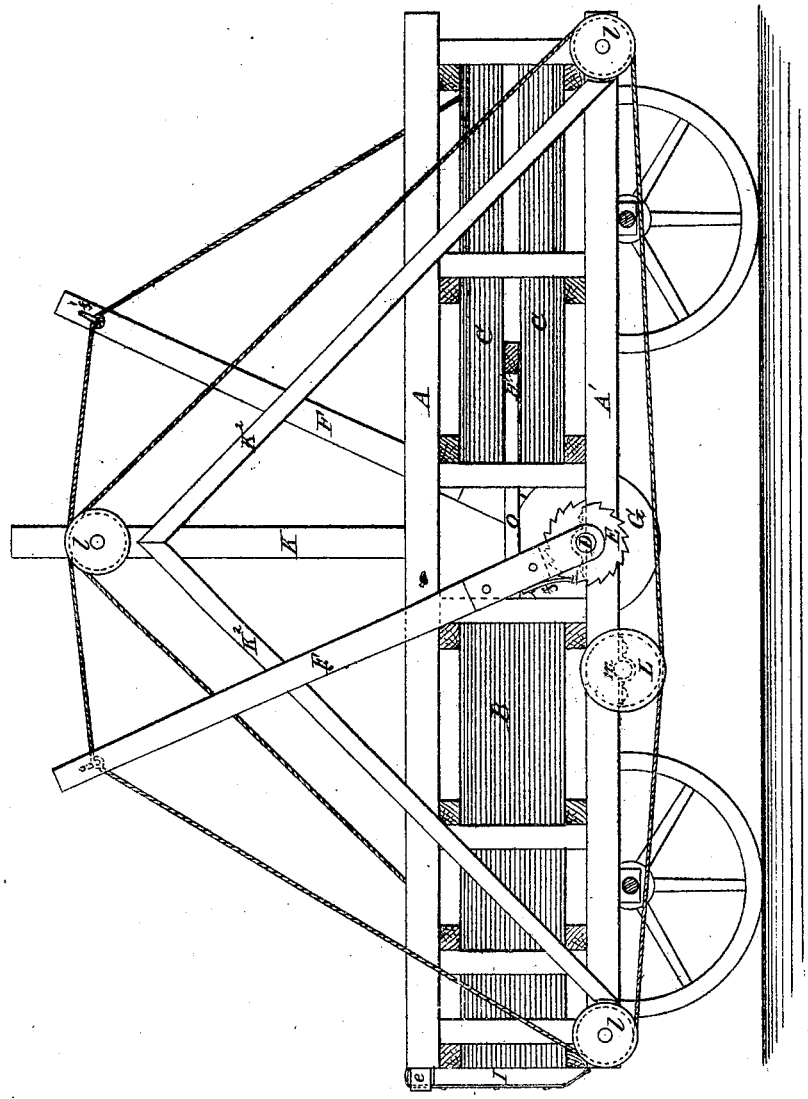
Figure 2:
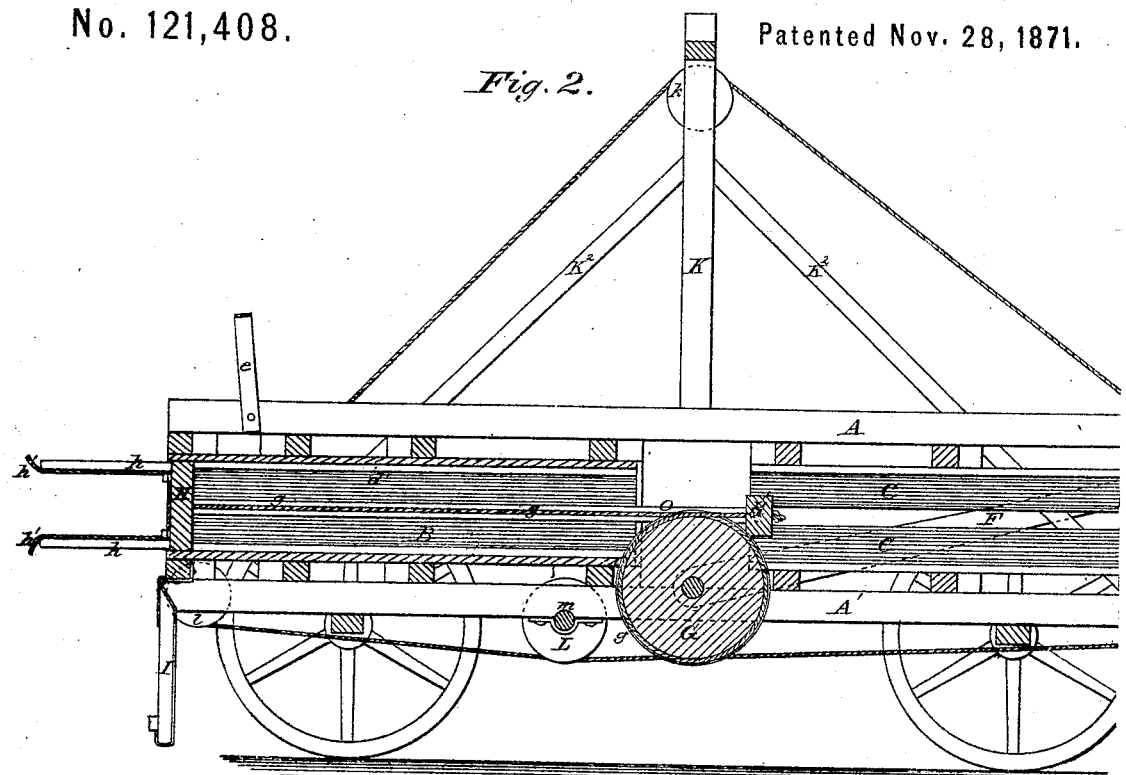
Figure 3:
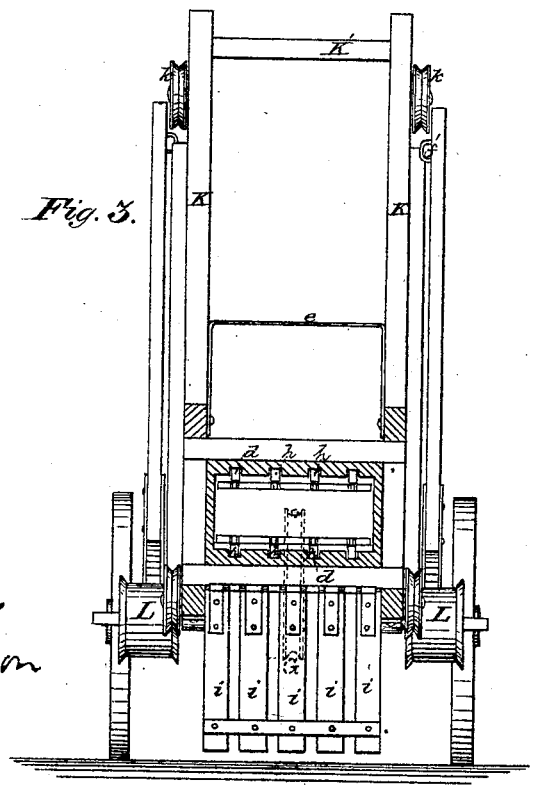

Figure 1 is a side elevation. Fig. 2 is a longitudinal sectional view. Fig. 3 is an end view.

The object of my improvement is to furnish a press for baling hay, cotton, &c., so constructed and arranged that the operator will be enabled to fasten the ropes, wire, cord, band, &c., that retains the bale while the full power or force which has compressed the same is still being exerted, and, after the fastening has been secured, in causing the follower by a direct horizontal pressure to drive the compressed bale out of the box, thus avoiding vent passages, &c., which heretofore have been deemed necessary with all other styles of presses. The nature of my invention consists in securing to the front face of the follower two series of horizontal arms so arranged as to carry the binding cord or wire that is to secure the bale, and which are, as the bale is pressed, so protruded through the slotted head-gate or door of the box as to permit of the cord or wire being fastened, while the full pressure that has formed the bale is, as has been said, still being exerted. My invention also consists in a combination of leverage and windlass, so arranged that after the bale is formed there shall yet be reserved sufficient latent force after the gate is opened and thrown down to give the necessary advance motion to drive or force the bale from its box.

The construction and operation of my invention are as follows: A A' represent a strong body or the frame work of the press placed upon a truck or provided with wheels for better transportation in the field. On this frame are secured the press-box B at one end and suitable horizontal guide timbers C C on the other. But, if preferred, these guide-timbers may be dispensed with and an additional press-box, B, may be secured, thus making it a double press. In the center of the frame is journaled a shaft, D, upon the outer ends of which are secured ratchet-wheels E E and levers F F, which are provided with a pawl, $f$, that catches into the notches of the ratchet-wheels E E, and by means of which the shaft D is revolved. At the center of this shaft D is secured a pulley-wheel, G, around which a rope, $g$, or chain passes, being secured at one end to the follower H and at the other end to the traveling-head H'. The follower and head are connected by the horizontal pieces o o. To the follower H a number of fingers, $h\ h$, is attached. These fingers are secured on the upper and lower faces of the follower and extend out horizontally therefrom, being parallel to each other. These fingers slide in grooves $d\ d$ cut on the inner surface of the press-box, and the fingers may also be provided with grooves, into which the ropes, wire, bands, &c., fit, or can otherwise be secured. The ropes $h'\ h'$ may be held in place at the front end of the follower H by clamp-springs, or in any well-known manner. The door I of the press is hinged at its lower end and is formed of ribbed pieces $i\ i$ or slotted, as clearly shown in Fig. 3, to admit the fingers $h\ h$ to pass through, so that when the proper compression of the bale is accomplished, while the full force of the follower is still being exerted, the ropes or chains can be detached from the fingers and tied or otherwise secured around the bale. When in place the door is held in position by a yoke or clasp, $e$. In the center of the press are arranged two uprights, K K, held together by the cross piece $K^1$ at the top, and braced by the pieces $K^2\ K^2$ to the side of the frame. Upon the outside of the uprights K K near their top are pivoted the pulleys $k\ k$, similar pulleys, $l\ l$, being journaled at each end of the frame A'. At the lower corner and near the center of the press on its lower side are journaled the winding-drums L L on shaft $m$. A suitable staple or other bearing, $f'$, is secured to the inner side of the levers F F, and to said staple or other bearing a strong rope or chain is fastened. This chain passes over the pulleys $k\ k\ l\ l$ and around the drum L, when it will be readily seen that by turning said drum the follower will be alternately drawn backward and forward by the rope or chain $g$, which passes around the pulley G, and great power is exerted by means of the levers F F. These levers F F are shown with a pawl acting on a single ratchet. In the full-sized press I contemplate using a double ratchet, and providing each lever with two pawls so arranged that in the movement of the press each lever shall perform a half motion.

The ropes or bands being first placed in position in the fingers $h$, the hay, cotton, or other material to be acted upon is placed in the press-box, when by turning the shaft $m$ and drum L the ropes draw the levers F F and the followers H H' toward the material until it is pressed sufficiently, when the bands or ropes which protrude through the door can be secured. The doors are then opened and the power is again applied to the shaft $m$, when the levers are still further depressed and the complete bale is forced out of the box B by the advance motion of the follower. This is a great advantage over all toggle and other lever presses as their force is spent when they are in a straight line, whereas the levers herein employed give an additional or advanced motion.

What I claim as new, and desire to secure by Letters Patent of the United States, is—

1. The fingers $h$ $h$, in combination with the follower H, as and for the purpose herein set forth.

2. The levers F F, in combination with the ratchet-wheels E E, pulley G, rope or chain $g$, and followers H H', arranged substantially in the manner and for the purpose set forth.

3. The combination of the levers F F with the pulleys $k$ $l$ $l$, drums L L, pulley G, rope $g$, and followers H H', and press-box B, all constructed and arranged substantially as and for the purpose set forth.

In testimony whereof I have signed my name to this specification in the presence of two subscribing witnesses.

WM. H. H. PEAIRS.

Witnesses:
   JOS. T. K. PLANT,
   EDWIN JAMES. (7)